US010202088B2

(12) United States Patent
Fritz et al.

(10) Patent No.: US 10,202,088 B2
(45) Date of Patent: Feb. 12, 2019

(54) COMBINED REMOTE SENSING, PROCESSING, AND SOLID STATE POWER CONTROL SYSTEM

(71) Applicant: Hamilton Sundstrand Corporation, Charlotte, NC (US)

(72) Inventors: Kevin Case Fritz, Rockford, IL (US); Christian Miller, Beloit, WI (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 198 days.

(21) Appl. No.: 15/007,291

(22) Filed: Jan. 27, 2016

(65) Prior Publication Data
US 2017/0203705 A1    Jul. 20, 2017

Related U.S. Application Data

(60) Provisional application No. 62/279,335, filed on Jan. 15, 2016.

(51) Int. Cl.
G07C 5/08      (2006.01)
B60R 16/023    (2006.01)
B60R 16/03     (2006.01)
G05B 15/02     (2006.01)
H04L 12/40     (2006.01)
(Continued)

(52) U.S. Cl.
CPC ............ *B60R 16/023* (2013.01); *B60R 16/03* (2013.01); *G05B 15/02* (2013.01); *G07C 5/08* (2013.01); *H02J 1/00* (2013.01); *H02J 4/00* (2013.01); *H04L 12/40* (2013.01); *B64D 2221/00* (2013.01)

(58) Field of Classification Search
CPC combination set(s) only.
See application file for complete search history.

(56) References Cited

U.S. PATENT DOCUMENTS 6,664,656 B2 * 12/2003 Bernier ................. B64D 41/00
                                                     244/60
7,634,329 B2    12/2009 Liu et al.
(Continued)

FOREIGN PATENT DOCUMENTS

EP    2945244 A1    11/2015
WO    2002023688 A2   3/2002

OTHER PUBLICATIONS

European Office Action for Application No. 17 151 479.7-1204; dated: May 31, 2018; 6 pgs.
(Continued)

*Primary Examiner* — Hussein Elchanti
(74) *Attorney, Agent, or Firm* — Cantor Colburn LLP

(57) ABSTRACT

A single-unit aerospace remote sensing and solid state power controller may include a processing module, a remote data concentrator (RDC) module in communication with the processing module, and configured to receive analog or discrete or discrete input comprising load sensor information and translate the analog or discrete input into a protocol operable by the processing module. The single-unit aerospace remote sensing and solid state power controller may further include a solid state power controller in communication with the RDC and the processing module, configured to receive load sensor information from the RDC module and control at least one load mechanism based on the load sensor information.

12 Claims, 4 Drawing Sheets

(51) Int. Cl.
    *H02J 1/00*          (2006.01)
    *H02J 4/00*          (2006.01)

(56) References Cited

U.S. PATENT DOCUMENTS

| | | |
|---|---|---|
| 7,805,204 B2 | 9/2010 | Ghanekar et al. |
| 8,049,360 B2 | 11/2011 | Karimi et al. |
| 8,148,842 B2 | 4/2012 | Maier |
| 8,275,494 B1 | 9/2012 | Roth |
| 8,391,788 B1 | 3/2013 | Mazuk |
| 8,600,584 B2 | 12/2013 | Fervel et al. |
| 2003/0047997 A1* | 3/2003 | Bernier ................ B64D 41/00 307/9.1 |
| 2006/0190202 A1* | 8/2006 | Ramsdale ........... H04L 41/0806 702/77 |
| 2012/0235496 A1 | 9/2012 | Krenz et al. |
| 2013/0169036 A1* | 7/2013 | Todd ........................ H02J 4/00 307/9.1 |
| 2015/0102663 A1 | 4/2015 | Brouwer |
| 2017/0101067 A1* | 4/2017 | Carleial ................ B60R 16/03 |

OTHER PUBLICATIONS

European Search Report for EP Application No. 17151479.7 dated May 8, 2017; 8 pages.

* cited by examiner

COMBINED REMOTE SENSING, PROCESSING, AND SOLID STATE POWER CONTROL SYSTEM

BACKGROUND

The present disclosure relates to solid state power control systems, and more specifically, to a combined remote sensing, processing, and solid state power control system for aerospace applications.

Conventional aeronautical power distribution systems can include sensing inputs, communications inputs, processing, control logic, and power control switching. These power distribution systems are typically custom designed to support the communications, logic, and power distribution needs of the target aircraft. Conventional aircraft may also include separate communications and sensor consolidation and processing that also include protocol conversion functions in the form of Remote Data Concentrators. Conventional systems have historically not combined the functions of a power distribution system with that of Remote Data Concentrators into a single unit. Instead, the sensory input, control logic, and power control switching systems are included as disparate systems that can add weight to the aircraft, and can add complexity for aircraft maintenance due to the necessity to keep multiple copies of custom-designed control systems on hand for maintenance and replacement.

SUMMARY

According to an embodiment of the present invention, a single-unit aerospace remote sensing and solid state power controller is described. The single-unit aerospace remote sensing and solid state power controller may include a processing module, and a remote data concentrator (RDC) module in communication with the processing module, and configured to receive analog or discrete input comprising load sensor information and translate the analog or discrete input into a protocol operable by the processing module. The single-unit aerospace remote sensing and solid state power controller may further include a solid state power controller in communication with the RDC and the processing module, configured to receive load sensor information from the RDC module and control at least one load mechanism based on the load sensor information.

In another embodiment of the present invention, a microcontroller-implemented method for controlling a single-unit aerospace remote sensing and solid state power controller is described. The method may include receiving, via a processor implementing a remote data concentrator (RDC) module, analog or discrete input having load sensor information received from at least one load sensor, translating the analog or discrete input into a protocol operable by a processing module in communication with the RDC module, and controlling, with a solid state power controller, at least one load mechanism based on the load sensor information.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
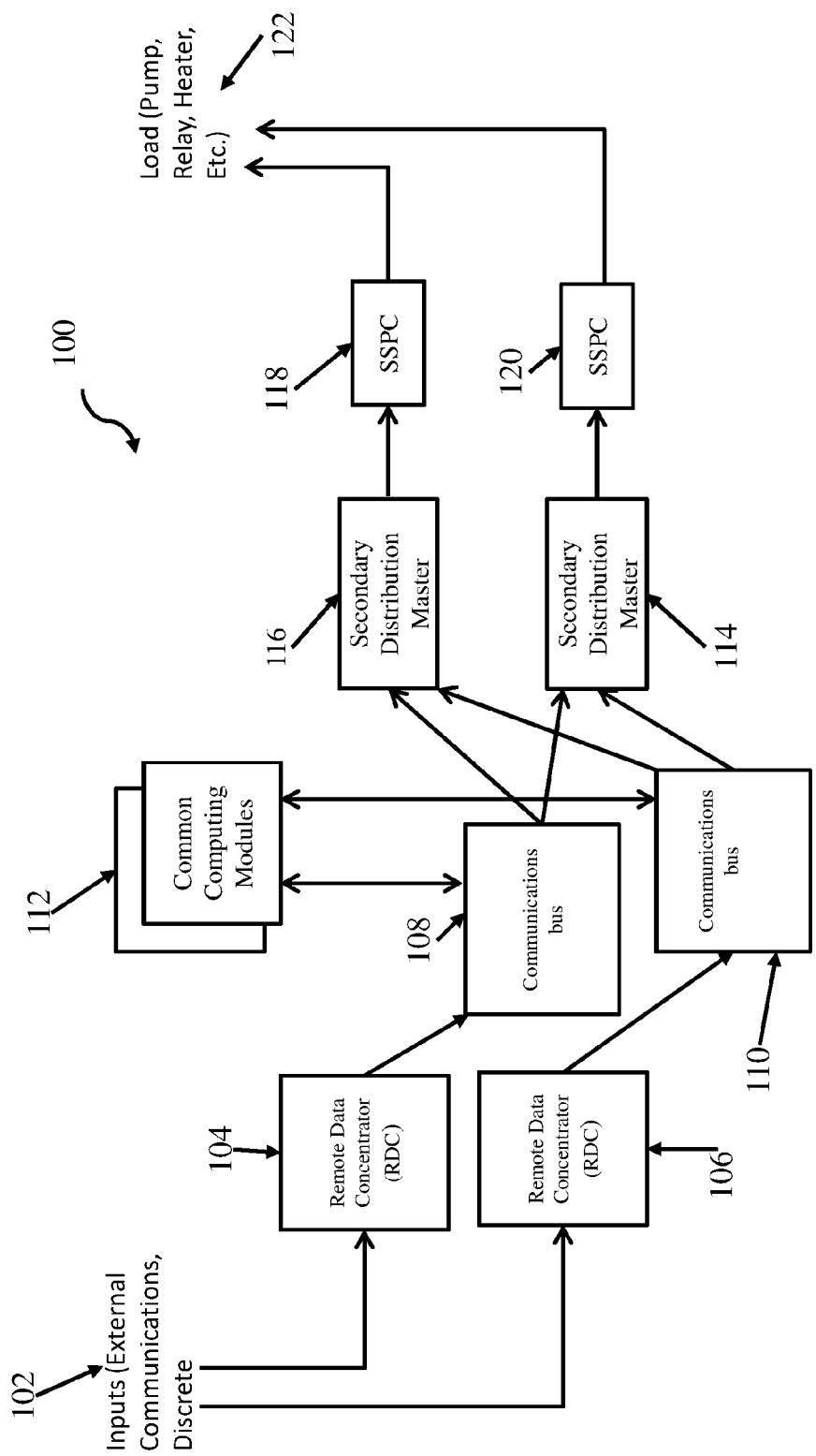
FIG. 1 depicts a conventional solid state power distribution system used in aeronautical applications.

FIG. 1 depicts a remote data concentrator and power distribution utility system 100 used in conventional aeronautical applications. Conventional system 100 may include one or more remote data concentrators (RDCs), depicted in FIG. 1 as RDCs 104 and 106. Conventional system 100 may further include one or more communications buses, depicted as communications busses 108 and 110 that may be operatively connected to RDCs 104 and 106. System 100 may further include a plurality of common computing modules 112, secondary distribution masters 114 and 116, and a plurality of solid state power controllers (SSPCs) 118 and 120. Each of the conventional sub-systems depicted in FIG. 1 may be separate custom-designed modules specific to the application and types of inputs, and the communications bus requirements with which they communicate. Accordingly, a conventional aircraft solid state control system may be challenging to maintain, especially at remote maintenance facilities, because of the different systems and hardware that must be included and supported.

As shown in FIG. 1, conventional aerospace remote sensing and SSPC systems may include separate RDC and power distribution systems, such as RDCs 104 and 106. For example, conventional system 100 may include a plurality of individual modules generally configured as disparate systems that are interconnected and working together to support flight operations. RDCs 104 and 106 have been separate sub-systems configured specifically to receive inputs 102, which may include input from sensors, external communications, etc., and consolidate them onto the aircraft backbone communication bus.

Although only two communications buses 108 and 110 are shown, modern aircraft often include a plurality of RDCs in communication with various communications buses, each performing a particular task for supporting flight operations. Common computing modules 112 may be one or more single-board computers with the purpose to host aircraft-level software. Common computing modules 112 may communicate with communications buses 101 and 110 to send and receive control information to secondary distribution masters 114 and 116.

Secondary distribution masters 114 and 116 are often separate sub-systems configured to send information to one or more SSPCs 118 and 120. SSPCs 118 and 120 may be operatively connected to a plurality of load mechanisms 122, which may be, for example, pumps, relays, heaters, etc. Although only two SSPCs 118 and 120 are shown, it should be appreciated that modern aircraft control systems may include any number of controller sub-systems.

SSPC distribution functions can include sensing inputs, control logic, and power control switching. RDC functions may include consolidating disparate communications and analog or discrete inputs for distribution on a backbone aircraft communications bus. Each of the sub-systems depicted with respect to FIG. 1 can contribute to greater weight load on the aircraft.

As shown in FIG. 1, conventional aerospace communications, sensing, control and solid state power distribution systems include various sub-systems, each being implemented as distinct units and/or control system cabinets. Implementing various solid state power control systems as separate custom-built systems adds weight and complexity to aeronautical designs. Accordingly, it may be advantageous to provide an aerospace remote sensing and SSPC where the components depicted with respect to system 100 are unified in a single unit. For example, according to some embodiments, a single unit may be a single unit that is customizable with processor-executable program instructions.

Figure 2:
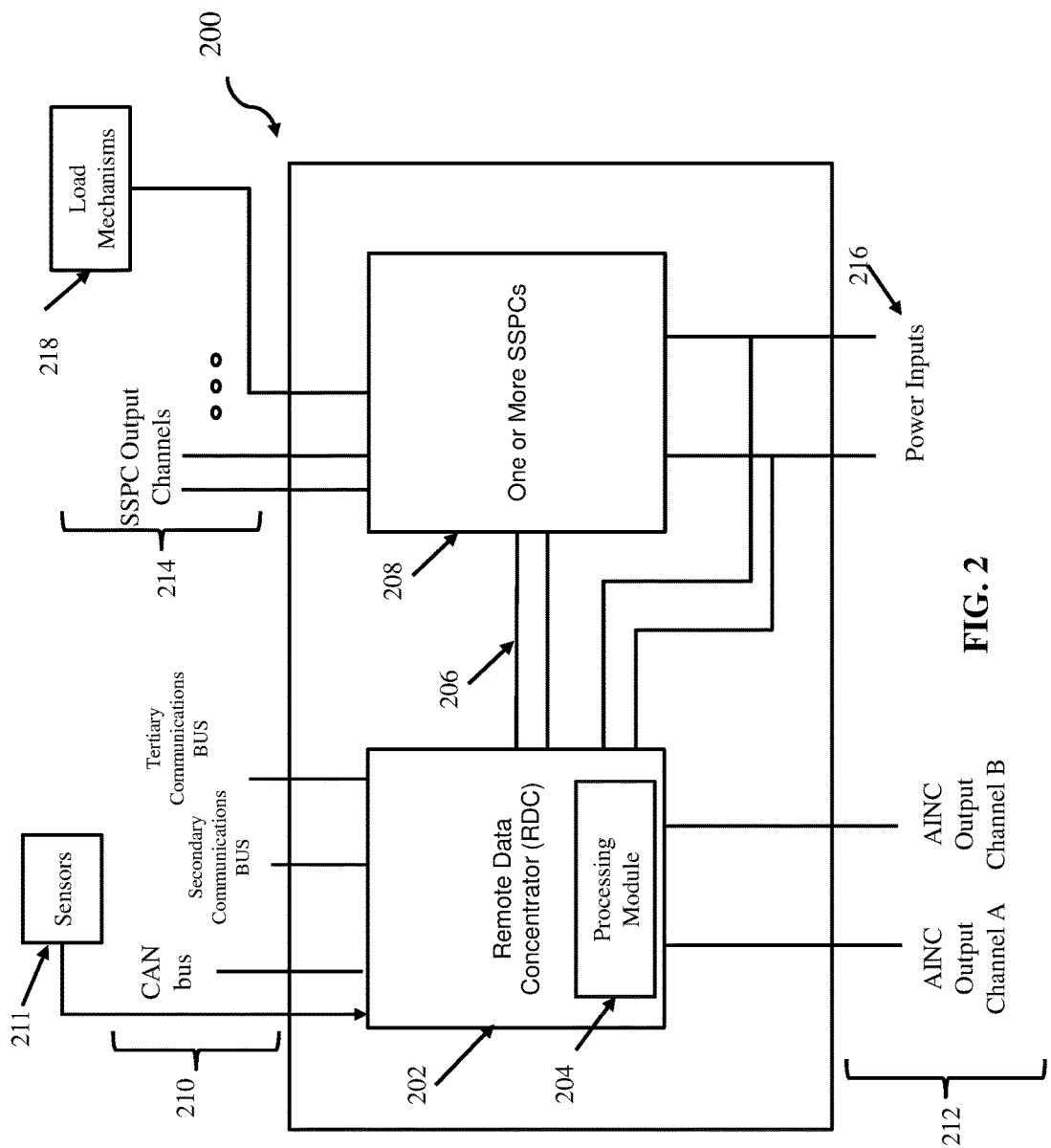
FIG. 2 depicts a block diagram of a combined Remote Data Concentrator and power distribution SSPCs according to one embodiment.

FIG. 2 depicts a block diagram of a combined Remote Data Concentrator and power distribution SSPCs, according to one embodiment. Referring now to FIG. 2, system 200 may include a remote data concentrator (RDC) 202, which may be in communication with a processing module 204, and configured to receive analog or discrete input comprising load sensor information. According to some embodiments, RDC 202 may be operatively connected to one or more communications buses 210 that may include, for example, a primary communications bus, a secondary communications BUS, a tertiary communications BUS, etc. System 200 may further include one or more SSPC output channels 214 that may be configured to control aspects of flight operations such as, for example, load mechanisms 218. According to some embodiments, the primary communications bus may be a CAN bus.

In some aspects, RDC 202 may receive the analog or discrete input from sensors 211, and translate the analog or discrete input into a protocol operable by the processing module. RDC 202 may be operatively connected to one or more SSPCs 208 via a plurality of redundant internal communications buses 206. SSPC 208 may be configured to receive load sensor information from the RDC module and control at least one load mechanism 218 based on the load sensor information. SSPC 208 may receive power from power inputs 216, which may also feed power to RDC 202 and processing module 204.

According to some embodiments, RDC 202 may include a plurality of input channels 212 configured to provide data transmission to and from RDC 202 and processing module 204. System 200 may include a plurality of communications buses 206 that may provide connectivity to aircraft communication systems.

Figure 3:
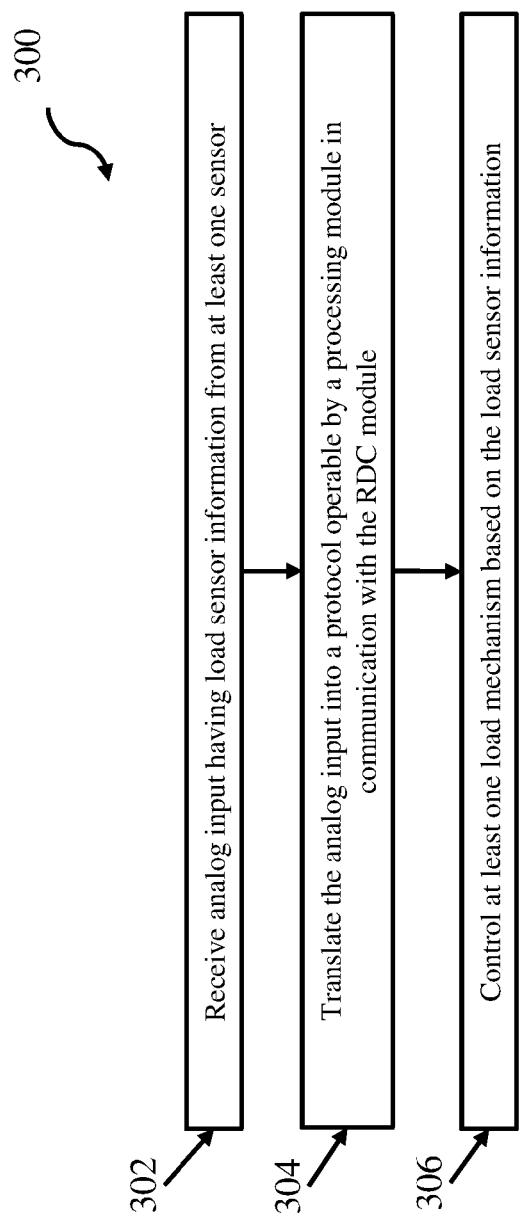
FIG. 3 depicts a flow diagram of a method for controlling an aerospace remote sensing and SSPC according to one embodiment.

FIG. 3 depicts a flow diagram of a method 300 for controlling an aerospace remote sensing and solid state power controller (system 200), according to one embodiment. Referring now to FIG. 3, according to one embodiment, system 200 may be configured to receive analog or discrete input and translate the input via processor module 204, as shown in block 302. The analog or discrete input 210 can include load sensor information received from at least one sensor 211. As shown in block 304, system 200 may translate the analog or discrete input into a protocol operable by a processing module in communication with the RDC 202. Processing module 204 may control one or more load mechanisms based on the load sensor information, as shown in block 306. According to some embodiments, system 200 may be configured on a single unit, such as, for example, a single card, or multiple cards within a single unit that combines RDC 202, processing module 204, and one or more SSPC 208.

According to some embodiments, by combining the sensory processing, logic processing, data consolidation, and control functionality into a single card or unit, several performance advantages may be realized. As with any aerospace application, weight is paramount. By combining these three functions to one cohesive system, many of the system controllers and their redundancies merge, causing a net reduction in weight. Moreover, the various disparate systems that may now be unified into a single card or unit may be more easily maintained and/or replaced in the field by aircraft maintenance personnel. System 200 may use a common communications network and processor for executing the logic, control, and communications consolidation functions. As a single system, the power input 216 and packaging (e.g., the control system cabinet, which is not shown) may be shared.

Figure 4:
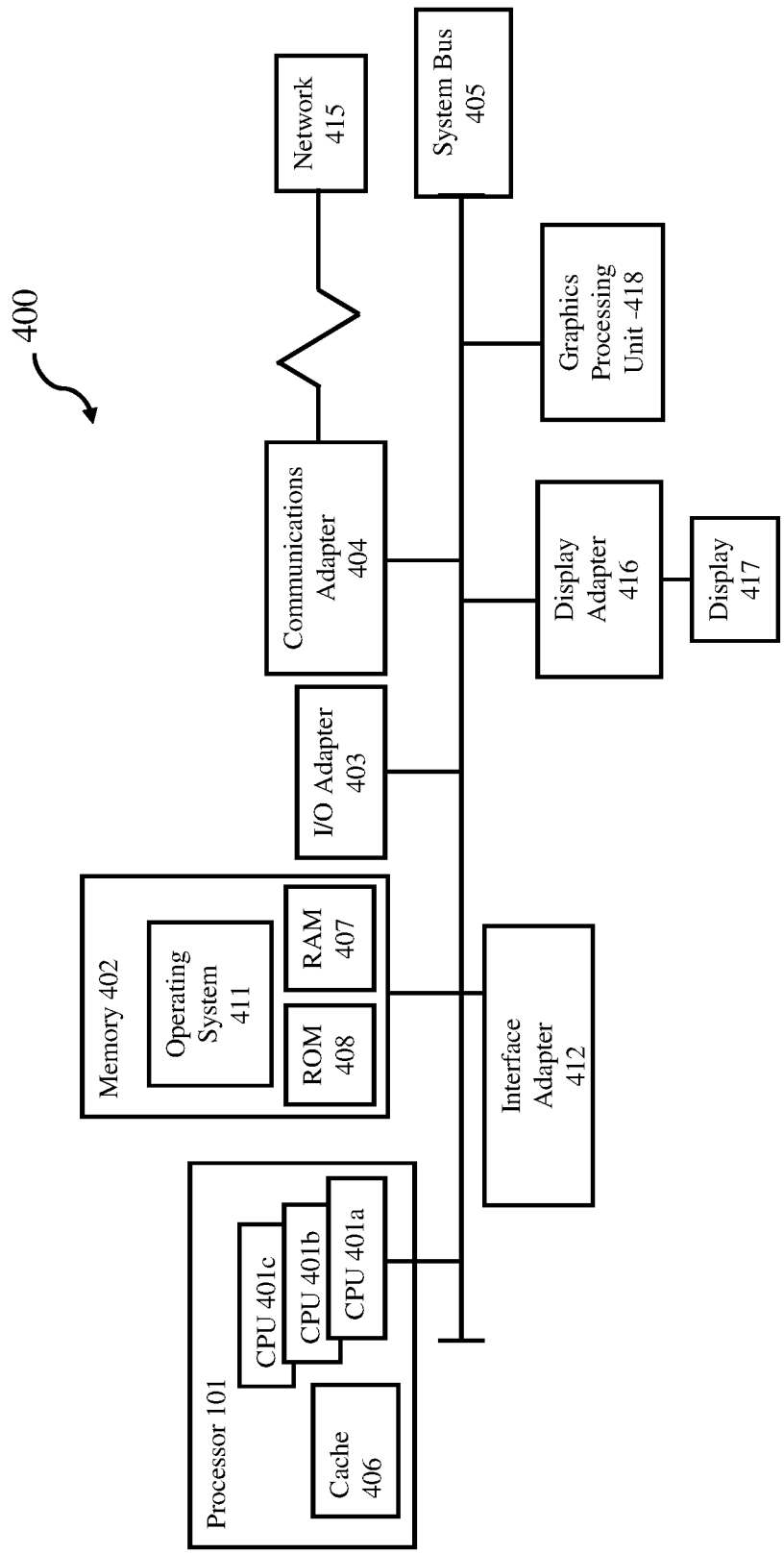
FIG. 4 illustrates a block diagram of a computer system for use in practicing the teachings herein.

FIG. 4 illustrates a block diagram of a computer system 400 (hereafter "computer 400") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer implemented as a single computing card or unit in an aerospace control system, or distributed across multiple cards in the system (for example, the aerospace remote sensing and SSPC 200 as shown in FIG. 2). Computer 400 therefore can embody a general-purpose computer and/or aircraft computing system configured to work with or as a part of system 200.

In an exemplary embodiment, in terms of hardware architecture, as shown in FIG. 4, the computer 400 includes a processor 401. Computer 400 also includes a memory 402 coupled to processor 401, and one or more input/output adaptors 403 that may be communicatively coupled via system bus 405. Memory 402 may be operatively coupled to one or more internal or external memory devices. Communications adaptor 404 may be operatively connect computer 400 to one or more networks 415. Processor 401 is a hardware device for executing hardware instructions or software, particularly that stored in a non-transitory computer-readable memory (e.g., memory 402). Processor 401 can be any custom made or commercially available processor, a central processing unit (CPU), a plurality of CPUs, for example, CPU 101a-401c, an auxiliary processor among several other processors associated with the computer 400, a semiconductor based microprocessor (in the form of a microchip or chip set), or generally any device for executing instructions. Processor 401 can include a memory cache 406, which may include, but is not limited to, an instruction cache to speed up executable instruction fetch, a data cache to speed up data fetch and store, and a translation lookaside buffer (TLB) used to speed up virtual-to-physical address translation for both executable instructions and data. Cache 406 may be organized as a hierarchy of more cache levels (L1, L2, etc.).

Memory 402 can include random access memory (RAM) 407 and read only memory (ROM) 408. RAM 407 can be any one or combination of volatile memory elements (e.g., DRAM, SRAM, SDRAM, etc.). ROM 408 can include any one or more nonvolatile memory elements (e.g., erasable programmable read only memory (EPROM), flash memory, electronically erasable programmable read only memory (EEPROM), etc. Moreover, memory 402 may incorporate electronic, magnetic, optical, and/or other types of memory devices. Note that the memory 402 can have a distributed architecture, where various components are situated remote from one another, but can be accessed by the processor 401.

The instructions in memory 402 may include one or more separate programs, each of which comprises an ordered listing of computer-executable instructions for implementing logical functions. In the example of FIG. 4, the instructions in memory 402 may include an operating system 411. Operating system 411 can control the execution of other computer programs and provides scheduling, input-output control, file and data management, memory management, and communication control and related services.

Input/output adaptor 403 can be, for example but not limited to, one or more buses or other wired or wireless connections, as is known in the art. Input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components. Interface adaptor 412 may be configured to operatively connect one or more input/output (I/O) devices to computer 400. The I/O devices connectable to interface adaptor 412 may further include devices that communicate both inputs and outputs. In an exemplary embodiment, computer 400 can further include communications adaptor 404 for coupling to aircraft or maintenance networks 415.

Network 415 can be an IP-based network for communication between computer 400 and any external device. Network 415 transmits and receives data between computer 400 and devices and/or systems external to computer 400. Network 415 may be a network internal to an aircraft, such as, for example, an avionics network, and/or the like. Network 415 may be implemented in a wireless fashion, e.g., using wireless protocols and technologies, such as WiFi, WiMax, etc. Network 415 may also be a wired network, e.g., an Ethernet network, an ARINC 429 network, a CAN, etc., having any wired connectivity including, e.g., an RS232 connection, R5422 connection, etc. Network 415 can also be a packet-switched network such as a local area network. The network 415 may be a fixed wireless network, a wireless local area network (LAN), a wireless personal area network (PAN), a virtual private network (VPN), or other suitable network system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A single-unit aerospace remote sensing and solid state power controller (SSPC) comprising:
   a processing module;
   a remote data concentrator (RDC) module in communication with the processing module, and configured to receive analog or discrete input comprising load sensor information and translate the analog or discrete input into a protocol operable by the processing module; and
   a SSPC in communication with the RDC and the processing module, configured to receive load sensor information from the RDC module and control a plurality of load mechanisms based on the load sensor information;
   wherein a single RDC is unified into a single card with the SSPC and configured to control the plurality of load mechanisms.

2. The single-unit aerospace remote sensing and SSPC of claim 1, wherein the RDC module is configured to receive a plurality of communications signals via at least one communications bus.

3. The single-unit aerospace remote sensing and SSPC of claim 1, wherein the SSPC is configurable to emulate a plurality of SSPC modules.

4. The single-unit aerospace remote sensing and SSPC of claim 1, wherein the RDC comprises an analog or discrete input connection, a CAN bus, a secondary communications bus, and a tertiary communications bus.

5. The single-unit aerospace remote sensing and SSPC of claim 1, wherein the SSPC comprises a plurality of output channels configured to operate a plurality of control load mechanisms.

6. The single-unit aerospace remote sensing and SSPC of claim 1, further comprising a plurality of redundant internal communications buses.

7. A computer-implemented method for controlling a single-unit aerospace remote sensing and solid state power controller (SSPC) comprising:

receiving, via a processor implementing a remote data concentrator (RDC) module, analog or discrete input having load sensor information received from at least one load sensor;

translating the analog or discrete input into a protocol operable by a processing module in communication with the RDC module; and controlling, with a SSPC, a plurality of load mechanisms based on the load sensor information;

wherein a single RDC is unified into a single card with the SSPC and configured to control the plurality of load mechanisms.

8. The computer-implemented method of claim 7, further comprising receiving, by the RDC module, a plurality of communications signals via at least one communications bus.

9. The computer-implemented method of claim 7, comprising emulating a plurality of SSPC modules with the SSPC.

10. The computer-implemented method of claim 7, wherein the RDC is configured for sending and receiving communications signals via an integrated analog or discrete input connection, a CAN bus, a secondary communications bus, and a tertiary communications bus.

11. The computer-implemented method of claim 7, further comprising operating a plurality of control load mechanisms via a plurality of output channels integrated in the SSPC.

12. The computer-implemented method of claim 7, further comprising configuring a plurality of redundant internal communications buses between the RDC module and the SSPC.

* * * * *